May 9, 1950 C. E. TACK ET AL 2,507,063
BRAKE HEAD ARRANGEMENT
Filed Feb. 8, 1946 3 Sheets-Sheet 1
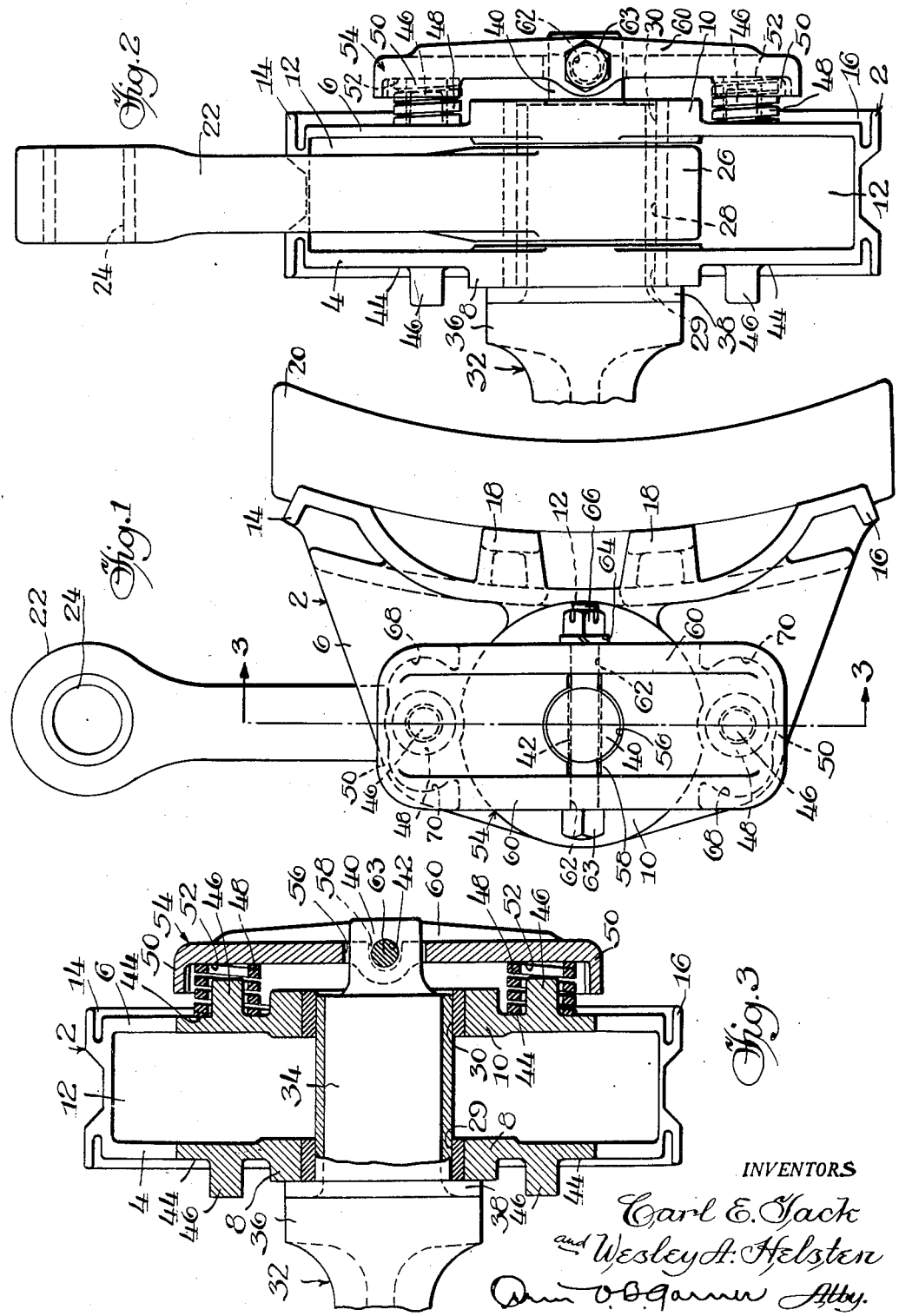
INVENTORS
Carl E. Tack
and Wesley A. Helsten May 9, 1950     C. E. TACK ET AL     2,507,063
BRAKE HEAD ARRANGEMENT
Filed Feb. 8, 1946     3 Sheets-Sheet 2
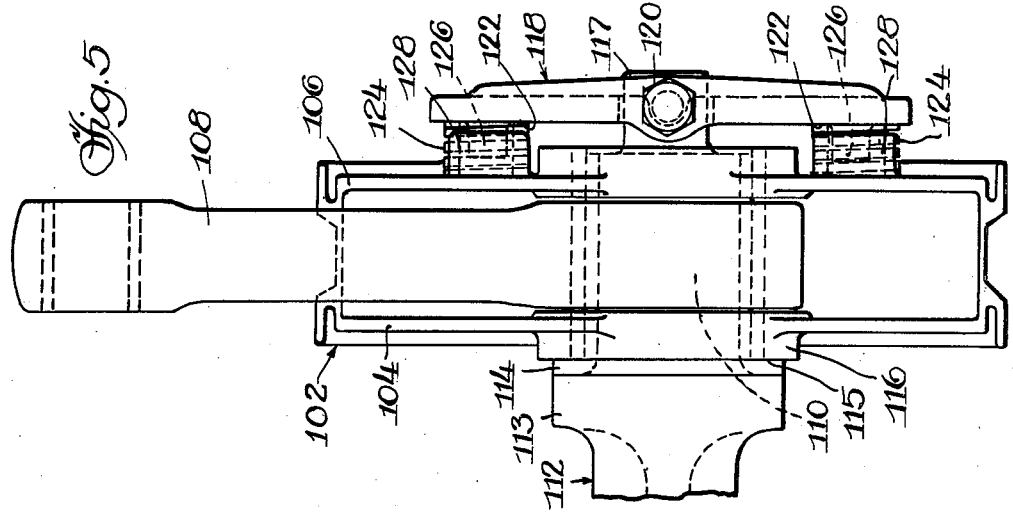
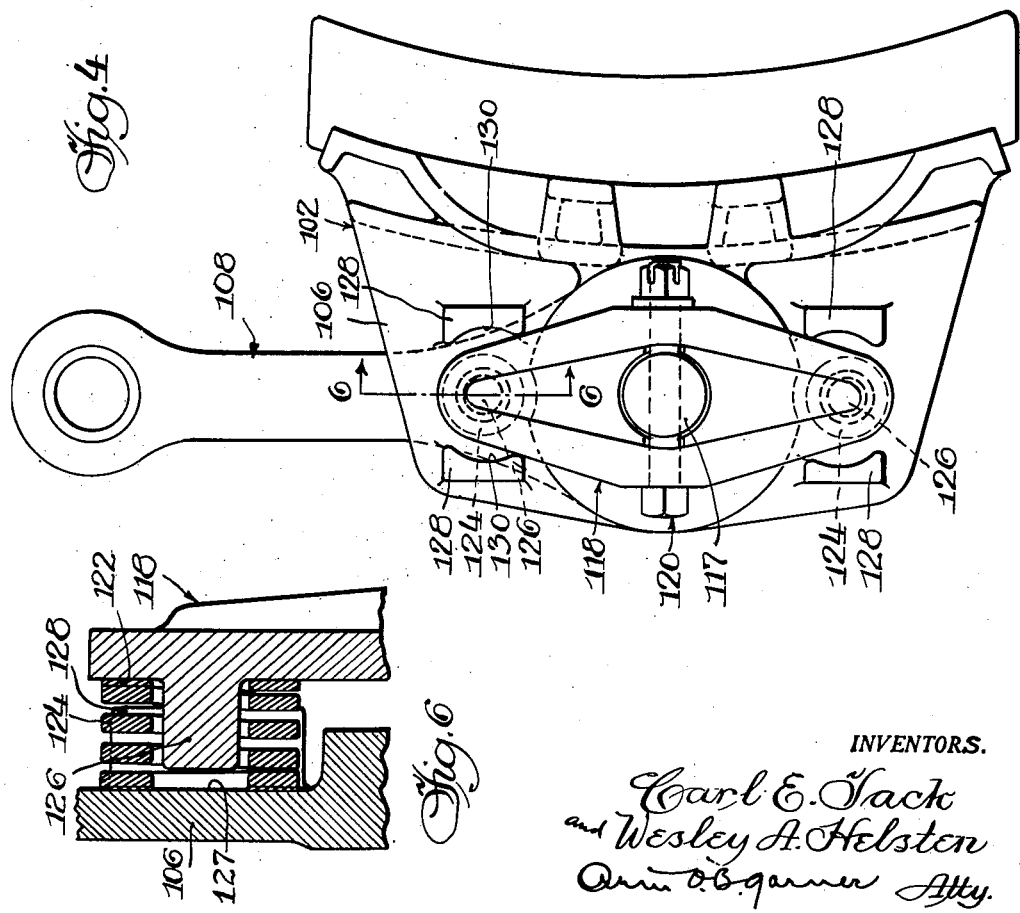
INVENTORS.
Carl E. Tack
and Wesley A. Helsten

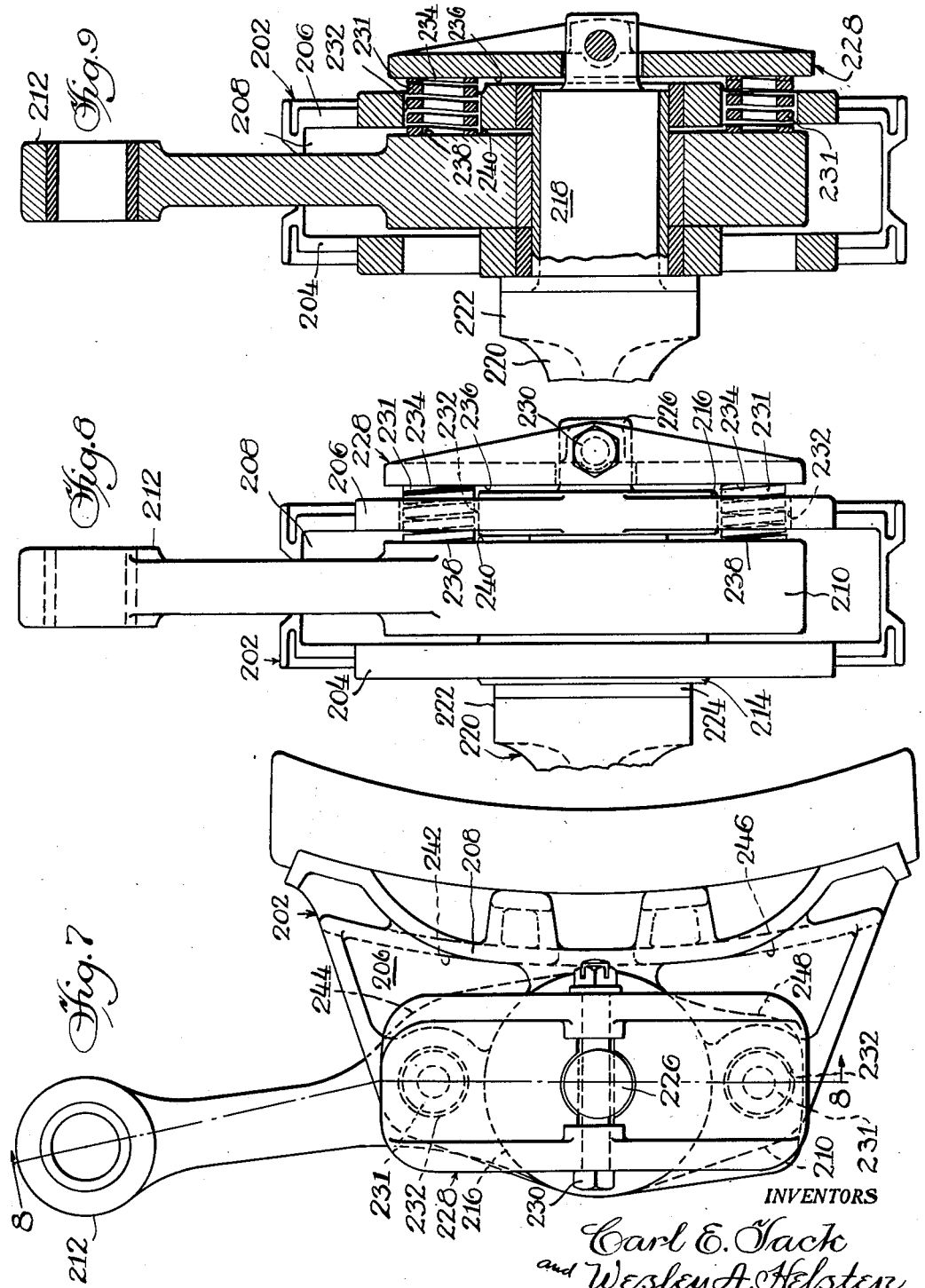

Patented May 9, 1950

2,507,063

UNITED STATES PATENT OFFICE 2,507,063

BRAKEHEAD ARRANGEMENT

Carl E. Tack and Wesley A. Helsten, Chicago, Ill., assignors to American Steel Foundries, Chicago, Ill., a corporation of New Jersey Application February 8, 1946, Serial No. 646,456

23 Claims. (Cl. 188—230)

Our invention relates to railway brake equipment and more particularly to mechanism for adjustably maintaining a brake head in a desired position on an associated support member, such mechanism being commonly known as a brake head balancing device.

In the illustrated embodiments of our invention, the brake head balancing device is applied to an arrangement in which brake head and hanger members are pivotally mounted on the trunnion of an associated beam, which comprises a shoulder frictionally engaging one of the members, and the balancing device includes spring means for urging said member into frictional engagement with said shoulder.

The general object of our invention is to design a device of the above described type including novel means for adjustably maintaining the brake head member in assembled relationship with the hanger member and the brake beam, said means including a member fixed to the beam for preventing disassembly of said members from said beam under service conditions, and compressed spring means reacting against two of said members for urging said brake head member into frictional engagement with the shoulder on the brake beam.

A specific object of our invention is to design a device of the type described comprising a spring plate or abutment member fixed to the brake beam and brake head and hanger members pivotally mounted on the beam, spring means being compressed between the abutment member and one of the other members for urging the brake head member into frictional engagement with a shoulder on the brake beam for yieldably resisting relative pivotal movement of the brake head member and the brake beam, said spring means being carried by one of said members for movement relative to the other members and having frictional engagement with at least one of said other members for the above-described purpose.

Another object of our invention is to provide novel means associated with one of the brake head and hanger members cooperating with means on the other member or the abutment member for limiting relative pivotal movement between the brake head member and the brake beam.

In the drawings:

Figure 1 is a side elevation of a brake arrangement embodying our invention;

Figure 2 is a rear elevation taken from the left as seen in Figure 1;

Figure 3 is a sectional view taken in the plane represented by the line 3—3 of Figure 1, the brake hanger being omitted in this view;

Figure 4 is a side elevation of a modification of our invention;

Figure 5 is a rear elevation taken from the left as seen in Figure 4;

Figure 6 is a sectional view taken in the vertical plane indicated by the line 6—6 of Figure 4;

Figure 7 is a side elevation of another modification of our invention;

Figure 8 is a rear elevation taken from the left as seen in Figure 7; and

Figure 9 is a sectional view taken in the planes indicated by the line 8—8 of Figure 7.

Describing the embodiment of our invention shown in Figures 1–3, inclusive, the brake head generally designated 2 comprises the spaced inboard and outboard walls 4 and 6 providing parallel bearing portions 8 and 10, respectively, said side walls having a transverse wall 12 extending therebetween and merging therewith, said transverse wall also merging with the spaced end or toe lugs 14 and 16, as well as the intermediate lugs 18, 18, said lugs being formed and arranged for connection to a brake shoe 20 in conventional manner.

The brake hanger or support member generally designated 22 is formed at its upper end with a bushed opening 24 affording a pivotal connection to a supporting frame member (not shown). The opposite end of the hanger 22 is provided with an annular bearing portion 26 extending between the spaced side walls 4 and 6 of the brake head and having a bushed opening 28 (Figure 2) in alignment with bushed openings 29 and 30 in the spaced inboard and outboard bearing portions 8 and 10, respectively, of the brake head.

The brake beam generally designated 32 includes a bushed trunnion end 34 extending through the openings 28—30 to afford a pivotal connection between the head and supporting hanger. The inboard end of the trunnion 34 terminates in a shoulder 36 on the beam to which a wear plate 38 may be secured in any desired manner as, for example, by welding, said plate being adapted for frictional engagement, as hereinafter described, with the bearing portion 8 of the brake head wall 4. It will be understood by those skilled in the art that, if desired, the wear plate 38 may be eliminated and the brake head may bear directly against the shoulder 36 of the beam, so that the plate 38 may, for functional purposes, be regarded as a part of the beam itself.

Adjacent its outboard end the beam is machined to form a portion 40 of reduced diameter having an opening 42 extending transversely therethrough and serving a purpose hereinafter described.

At opposite sides of each of the bearing portions 8 and 10 of the brake head, the brake head walls 4 and 6 may be formed with spring seats 44, 44, each of said seats having a spring positioning lug 46 centrally formed thereon. A pair of springs 48, 48 may be seated against the seats 44, 44 on the outboard wall 6 and be positioned thereon by the associated lugs 46, 46, said springs having their opposite ends received within spring pockets 50, 50 and engaging spring seats 52, 52 provided at the upper and lower ends respectively of the spring plate, generally designated 54.

The spring plate 54 is substantially rectangular in side elevation (Figure 1) and is provided on its inboard side with the aforementioned spring seats 52, 52 and spring pockets 50, 50 and is formed with a centrally disposed opening 56 receiving the portion 40 of the beam, said plate having on its outboard side a slot 58 and spaced parallel ribs 60, 60 having openings 62, 62 in alignment with said slot 58 and the opening 42 in the portion 40 of the beam, a bolt 63 extending through said openings and slot and having a lock washer 64 and a nut 66 on the threaded end thereof to prevent unwanted movement of the bolt transversely of the beam. It will be apparent that the spring plate 54 is thus fixed against movement relative to the brake beam and will maintain the brake head, brake hanger and beam in assembled relationship and will also serve to transmit reaction of the springs 48, 48 to the beam 32, the inboard ends of said spring being compressed against the outboard wall 6 of the brake head, whereby the inboard wall 4 thereof is urged into frictional engagement with the before-mentioned wear plate 38.

In the arrangement described, the spring plate 54 can not move relative to the beam, and as the springs 48, 48 will rotate with the brake head relative to the plate and beam due to the engagement of the springs by the lugs 46, 46 on the brake head, the outboard ends of the springs 48, 48 will frictionally engage said plate to further yieldably resist rotation of the brake head relative to the beam. It may be noted that each of the lugs 46, 46 on the brake head side wall 6 extends within the associated spring for substantially its entire length so that bending stresses on the springs, with resultant possible breakage of the same, is prevented as the brake head rotates on the trunnion 34. To permit movement of the springs 48, 48 with the brake head relative to the plate 54, each spring pocket 50 of the plate has the lateral inner margins thereof spaced a substantial distance from the associated spring 48, and it may be noted that each of these margins is arcuately formed to conform to the adjacent side of said spring for affording stops 68 and 70 respectively engageable therewith for limiting rotation on the brake head in opposite directions on the beam.

In the modification illustrated in Figures 4-6, the brake assembly is substantially similar to that previously described in that the brake head 102 comprises spaced side walls 104 and 106 receiving therebetween a brake hanger 108 having an opening in the lower bearing end thereof in alignment with openings in said walls, said openings receiving the trunnion end 110 of a brake beam 112 having a shoulder 113 with a wear plate 114 secured thereto, said plate 114 having frictional engagement as at 115 with the bearing portion 116 of the brake head wall 104, and said trunnion end 110 having a portion 117 of reduced diameter at its outboard extremity on which a spring plate 118 is fixed by a nut and bolt assembly 120 as in the previously described brake assembly.

In the present modification, the plate 118 is of generally oval formation, as seen in Figure 4, and is provided at opposite ends thereof with spring seats 122, 122 each seating one end of a spring 124 sleeved over a positioning lug 126 centrally disposed on the seat and having its opposite end engaging an adjacent spring seat 127 on the outboard brake head wall 106. It will be apparent that the compressed springs 124, 124 will react between the plate 118 and the side wall 106 of the brake head to urge the bearing 116 on the side wall 108 of the brake head into frictional engagement with the shoulder 113 on the beam and thereby yieldably restrain pivotal movement of the brake head on the beam and that further frictional resistance to rotation of the brake head will be had by the frictional engagement of the springs 124, 124 with the side wall 106 of the brake head as the head revolves on the beam. As in the previous modification, each lug 126 extends for a substantial distance within the associated spring to prevent bending stresses on the spring tending to cause breakage of the same. To limit rotation of the brake head on the beam, the side wall 106 of the brake head is formed with spaced laterally projecting bosses 128, 128 at opposite sides of each spring 124, said bosses having opposed arcuate surfaces 130, 130 engageable with the springs upon rotation of the head on the beam.

In the modification illustrated in Figures 7-9, the brake assembly comprises the brake head 202 having spaced inboard and outboard walls 204 and 206 and the transverse wall 208, said walls 204 and 206 receiving therebetween a bearing portion 210 of a brake hanger 212, said bearing portion being substantially oval in side elevation (Figure 7) for a purpose hereinafter described and having an opening in alignment with openings in the bearing portions 214, 216 of the brake head walls 204 and 206 respectively, said openings receiving the trunnion end 218 of a brake beam 220 having a shoulder 222 at one end with a wear plate 224 welded thereto and in frictional engagement with the brake head bearing portion 214 and having at its opposite end a reduced portion 226 on which is fixed a spring plate 228 by a bolt and nut assembly 230, as previously described.

The bearing portion 214 of the brake head is urged into frictional engagement with the wear plate 224 secured to the shoulder 222 on the beam by means of a pair of coil springs 231, 231 extending through spaced vertically aligned transverse openings 232, 232 in the side wall 206 of the brake head and compressed between the spring plate 228 and the bearing portion 210 of the brake hanger 212, said springs being disposed at opposite sides of the brake beam and each spring having engagement at one end thereof as at 234 with the inboard surface 236 of the plate 228 and being seated at its opposite end as at 238 against an outboard surface 240 on the bearing portion 210 of the hanger 212. It will be apparent that the springs reacting against the spring plate 228 and the brake hanger 212 will urge the inboard side of the hanger bearing portion 210 into engagement with the bearing portion 214 of the brake head and the latter against and into frictional engagement with the wear plate 224 on the brake beam. Relative pivotal movement of the brake head and brake beam is additionally frictionally resisted by the frictional engagement of the springs at their opposite ends with the surfaces 236 and 240 of the spring plate 228 and the hanger bearing portion 210, respectively, as it will be apparent that the compressed springs confined in the openings 232, 232 in the side wall 204 of the brake head will move with the brake head relative to the hanger and spring plate during rotation of the brake head on the beam 220.

It may be noted from a consideration of Figures 6 and 7 that a substantial portion of each spring is housed and confined within its associated opening 232 in the relatively thick wall 206 of the brake head so that bending stresses on the springs will be negligible during rotation of the brake head on the brake beam relative to the brake hanger and the spring plate.

Referring now to Figure 7, rotation of the brake head on the beam will be limited in a counterclockwise direction by the engagement of the upper rear surface 242 of the transverse wall 208 of the brake head with the adjacent arcuate surface 244 of the oval bearing portion 210 of the hanger 212, and pivotal movement of the brake head in a clockwise direction will be limited by the lower rear surface 246 on the transverse wall 208 of the brake head engaging the adjacent arcuate surface 248 of the hanger bearing portion 210.

It is to be understood that we do not wish to be limited by the exact embodiments of the device shown which are merely by way of illustration and not limitation as various and other forms of the device will, of course, be apparent to those skilled in the art without departing from the spirit of the invention or the scope of the claims.

We claim:

1. In a brake head balancing device, a brake head having spaced inboard and outboard walls, a support member extending therebetween, a brake beam having a shoulder frictionally engaging said inboard wall and comprising a trunnion extending through aligned openings in said walls and said member to afford a pivotal connection therebetween, a spring plate on said trunnion adjacent said outboard wall having spaced parallel ribs receiving said trunnion therebetween, rigid means extending through aligned openings in said trunnion and said ribs and preventing movement of said plate relative to said trunnion, spring-positioning elements on said outboard wall, springs sleeved over respective elements and compressed between said plate and said outboard wall, said springs being movable with said brake head and frictionally engaging said plate, and stop means on said plate at opposite sides of each spring for engagement therewith to limit relative pivotal movement between said brake head and said beam.

2. In a brake head balancing device, brake head and hanger members, one of said members having spaced rigid means receiving the other member therebetween, a brake beam having a trunnion extending through said rigid means and said other member and pivotally connecting the same, said trunnion having a shoulder in frictional engagement with one of said rigid means for yieldably resisting rotation of said brake head member on said beam, a spring plate on said trunnion, means preventing relative movement of said plate and trunnion, springs compressed between and reacting against said plate and the other of said rigid means, and positioning means for said springs on said plate and restraining movement of said springs relative to said plate whereby rotation of said brake head member is further yieldably resisted by the frictional engagement of said springs with said other rigid means.

3. In a brake head balancing device, a brake head with spaced inboard and outboard walls, a brake hanger extending between said walls, a brake beam having a shoulder engaging the inboard wall and comprising a trunnion extending through aligned openings in said walls and hanger to afford a pivotal connection therebetween, an abutment member on said trunnion and having spaced ribs on one side thereof disposed at opposite sides of said trunnion, means extending through aligned openings in said ribs and said trunnion for preventing relative movement of said plate and trunnion, spring-positioning lugs on said plate on the opposite side thereof, a spring sleeved over each lug and compressed between said plate and said outboard wall and frictionally engaging the latter, and abutment means on said outboard wall engageable with said springs for limiting relative pivotal movement of said head and said beam.

4. In a brake head balancing device, a brake head having spaced inboard and outboard walls, a support member extending therebetween, a brake beam having a shoulder frictionally engaging said inboard wall and comprising a trunnion extending through aligned openings in said walls and said member to afford a pivotal connection therebetween, a spring plate on said trunnion adjacent said outboard wall having spaced parallel ribs receiving said trunnion therebetween, rigid means extending through aligned openings in said trunnion and said ribs and preventing movement of said plate relative to said trunnion, spring-positioning elements on said outboard wall, springs sleeved over respective elements and compressed between said plate and said outboard wall, said springs being movable with said brake head and frictionally engaging said plate.

5. In a brake head balancing device, a brake head member, a support member, a brake beam having a trunnion extending through aligned openings in said members to afford a pivotal connection therebetween and provided with a shoulder at one end of said trunnion, a spring plate member on said trunnion at the opposite end thereof, pivot means extending transversely through said trunnion and connecting said trunnion with said plate member, said pivot means preventing relative axial and rotative movement of said plate member relative to said beam, maintaining said device in assembled relationship and accommodating pivotal movement of said plate member in the axial plane of said trunnion, and springs at opposite sides of said pivot means compressed between and reacting against said plate member and one of the other of said members to urge said brake head member into frictional engagement with said shoulder, said springs being carried by one of said members for movement relative to the other members and frictionally engaging at least one of the other members.

6. In a brake head balancing device, a brake head member, a support member, a brake beam having a pivot portion connecting said members and comprising a shoulder adjacent said pivot portion, a plate member loosely sleeved on said pivot portion, means extending through said pivot portion and fixed to said plate member preventing relative rotative and axial movement therebetween and accommodating pivotal movement therebetween transversely of said portion, resilient means at opposite sides of said first-named means compressed between and reacting against said plate member and one of the other members for urging said brake head member into frictional engagement with said shoulder, said resilient means being carried by one of said members for movement therewith relative to the other two members and having frictional engagement with at least one of said two members.

7. In a brake head balancing device, a brake head member, a brake hanger, a brake beam having a shoulder frictionally engaging said member and comprising a trunnion extending through aligned openings in said member and hanger to afford a pivotal connection therebetween, an abutment member on said trunnion, means secured to said abutment member and said trunnion preventing relative movement thereof, spring-positioning lugs on one of said members and extending toward the other member, coil springs sleeved over respective lugs and compressed between said members and in frictional engagement with said other member, and stop means on said other member engageable with said springs for limiting relative pivotal movement of said members.

8. In a brake head balancing device, a brake head having spaced inboard and outboard walls and a transverse wall connecting the same, a support member extending between said walls, a pivot member extending through aligned openings in said walls and said support member to afford a pivotal connection therebetween and having a shoulder in frictional engagement with said inboard wall, a spring plate mounted on said pivot member, spaced openings in said outboard wall, springs in said openings and compressed between and reacting against said support member and said plate and in frictional engagement therewith, and abutment means on said support member engageable with said transverse wall to limit relative pivotal movement of said head and said pivot member.

9. In a balancing and retaining device, a pivoted member having an opening, a pivot element extending through the opening and having an abutment engageable with a surface of said pivoted member; the combination of a plate member, a pair of springs compressed between said members for urging said surface against said abutment, and means for equalizing the pressure of said springs against said pivoted member comprising pin means for pivotally connecting the plate member to said element on an axis angularly related to a plane bisecting the compressional axes of said springs, said springs directly slidably engaging at least one of said members.

10. In a brake head balancing device, a brake head member, a support member, a brake beam having a trunnion extending through aligned openings in said members and pivotally connecting the same, a shoulder on said beam at one end of said trunnion, a spring plate member on said trunnion at the other end thereof, means connecting said trunnion and plate member accommodating pivotal movement of said plate member relative said trunnion transversely of said other members and preventing relative rotative and axial movement of said plate member relative thereto, and spring means carried by one of said members at opposite sides of said means adjacent each end of said plate member for movement with said one member relative to the other members, said spring means being compressed and reacting between one of said members and said plate member and having frictional engagement with at least one of the two last-named members, said plate member in pivoting on said means serving to balance the reaction of said spring means against said last-named one member.

11. In a brake head balancing device, a brake head member, a support member, a pivot element pivotally connecting said members and having a shoulder in frictional engagement with one side of said brake head member, an abutment member loosely mounted on said element at the opposite side of said brake head member, means preventing relative rotative and axial movement of said abutment member and said element and accommodating pivotal movement between the same transversely of the axis of said element, and a pair of springs at opposite sides of said element and compressed between and engaging said abutment member and one of the other members and having frictional engagement with at least one of the engaged members, said abutment member serving to equalize the reaction forces of said springs.

12. In a break head balancing device, a brake head member, a support member, a pivot element pivotally connecting said members and having a shoulder in frictional engagement with said brake head member, an abutment member on said element, means preventing relative rotative and axial movement of said abutment member and said element and accommodating pivotal movement of said abutment member relative said pivot element transversely thereof, and resilient means at opposite sides of said first-named means and substantially equidistantly spaced from said element in engagement with and compressed between said abutment member and one of the other members, said abutment member substantially equalizing the reaction of said resilient means, said resilient means being carried by one of said members for movement therewith relative to the other members and having frictional engagement with at least one of said other members.

13. In a brake head balancing device, brake head and hanger members, a pivot element connecting said members and having a shoulder in frictional engagement with one of said members, an abutment member on said element and fixed intermediate its ends against rotative and axial movement relative thereto and said brake head and hanger members and pivotal transversely of said element, a pair of coil springs carried by one of said members one adjacent each end of said abutment members for movement said one member relative to the other members, said springs being compressed between and reacting against one of said members and said abutment member and having frictional engagement with at least one of these two members, said abutment member equalizing the reaction of said springs between said last-named one member and the opposite ends of said abutment member through said pivotal movement of said abutment member.

14. In a brake head balancing device, a brake head member, a support member, a pivot element pivotally mounting said members, an abutment member connected to said element, and spring means carried by one of said members compressed against and in slidable frictional engagement with both of the other members.

15. In a brake head balancing device, a brake head having spaced inboard and outboard walls, a support member extending between said walls, a pivot member extending through aligned openings in said walls and said support member to afford a pivotal connection therebetween and having a shoulder in frictional engagement with said inboard wall, a spring plate mounted on said pivot member, spaced openings in said outboard wall, and springs in said openings and compressed between and reacting against said support member and said plate and in frictional engagement therewith.

16. In a brake head balancing device, brake head and hanger members, a brake beam having a trunnion pivotally connecting said members and having a shoulder frictionally engaging said brake head member, a plate member on said trunnion, rigid means fixing said plate member to said trunnion against rotative and axial movement relative thereto and accommodating pivotal movement of said plate member substantially at right angles to the axis of said trunnion, and springs aligned transversely of said trunnion and disposed at opposite sides thereof and compressed between and reacting against said plate member and one of said members for urging said brake head member into frictional engagement with said shoulder and having frictional engagement with at least one of the associated members, said plate member serving to equalize the reaction of said springs against the associated members.

17. In a brake head balancing device, a brake head member, a support member, a pivot element pivotally mounting said members, an abutment member connected to said element, spring means carried by one of said members compressed against and in slidable frictional engagement with both of the other members, and interengaging stop means on said brake head and support members for limiting relative rotation therebetween.

18. In a brake rigging, a pivot element, a brake head member and a support member pivoted thereon, an abutment member connected to said element, and spring-actuated friction means carried by one of said members and in slidable frictional engagement with both of the other members.

19. In a brake head balancing device, brake head and hanger members, a pivot element pivotally connecting said members and having a shoulder in frictional engagement with said brake head member, an abutment member connected intermediate its ends to said element and fixed against all movement relative thereto and said members except pivotal movement transversely of said element, resilient means compressed between and engaging one of said members and the opposite ends of said abutment member and having frictional engagement with at least one of said engaged members, said abutment member through pivotal movement thereof transmitting the reaction of said springs to each other for equalizing the reaction thereof against said engaged members.

20. In a brake head balancing device, a brake head member, a support member, a pivot element pivotally mounting said members and comprising a shoulder in frictional engagement with one of said members, an abutment member fixed medially between the ends thereof to said element against rotative and axial movement relative thereto and having pivotal movement transversely thereof, and spring means at opposite sides of said element compressed between the opposite ends of said abutment member and one of the other of said members and supported by one thereof and in frictional engagement with the other thereof.

21. In a brake head balancing device, a brake beam having a trunnion with a shoulder at its inboard end, a brake head pivoted on said trunnion having one side in frictional engagement with said shoulder, a spring plate at the opposite side of said head, a pivot element adjacent said plate extending transversely through said trunnion pivotally connecting said plate intermediate the ends thereof with said trunnion and permitting pivotal movement of said plate on an axis transversely of said trunnion, springs at opposite sides of said pivot element adjacent each end of said plate and compressed between the same and the adjacent side of said head for urging the latter into said engagement with said shoulder, and lugs on said head received within the respective springs for holding said springs for movement therewith, said springs slidably and frictionally engaging said spring plate for resisting said movement of said head, said plate being adapted to equalize the reaction of said springs against said head whereby the latter is held under substantially equal pressure in full face abutment with said shoulder in all areas of engagement therewith.

22. In a brake head balancing device, a brake beam having a shoulder, a brake head member, a supporting member, a trunnion projecting from said shoulder pivotally connecting said members, a spring plate member, a pivot element extending through said spring plate member intermediate the ends thereof and transversely through said trunnion at the end remote from said shoulder interconnecting said spring plate member and trunnion and affording pivotal movement for said plate member transversely of the pivotal movement of said brake head and hanger members, coil springs positioned adjacent the ends of said plate member and arranged with their axes parallel to the axis of said trunnion and compressed between and bearing at their ends against said plate member and one of the other members, and means on one of said members carrying said springs, said plate member adjusting the reaction of said springs thereagainst and against said one of the other members by pivoting on said element so that said head and supporting members are urged toward said shoulder under substantially uniform pressure at opposite sides of said trunnion, said springs frictionally engaging at least one of the members bearing at its ends.

23. In a brake arrangement, a pivot element, a brake head member and a support member rotatably mounted thereon, an abutment pivoted to said element on an axis extending transversely of said element, and spring means disposed at opposite sides of said axis and compressed directly between said abutment and one of said members and in slidable engagement with at least one thereof, said abutment by pivoting on said axis serving to transmit forces between said spring means.

CARL E. TACK.
WESLEY A. HELSTEN.

REFERENCES CITED

The following references are of record in the file of this patent:

UNITED STATES PATENTS

| Number | Name | Date |
|---|---|---|
| 1,643,837 | Christianson et al. | Sept. 27, 1927 |
| 2,010,531 | Baselt | Aug. 6, 1935 |
| 2,097,584 | Burrows et al. | Nov. 2, 1937 |
| 2,281,535 | Drews | Apr. 28, 1942 |
| 2,418,022 | Flesch | Mar. 25, 1947 |